United States Patent [19]

Wahnemuehl

[11] 3,976,157

[45] Aug. 24, 1976

[54] SELF-LOCKING LATCH FOR VEHICLE PANEL MEMBERS

[75] Inventor: Edgar Wahnemuehl, Mulheim (Ruhr), Germany

[73] Assignee: Clark Equipment Company, Buchanan, Mich.

[22] Filed: Feb. 18, 1975

[21] Appl. No.: 550,391

[52] U.S. Cl. .............................. 180/69 R; 292/218; 292/228; 292/DIG. 14; 296/35 A; 296/76

[51] Int. Cl.² ...................... B62D 25/10; E05C 3/14

[58] Field of Search ............. 180/69 C, 69 R, 89 A, 180/89 R, 69.1; 296/76, 35 A, 35 R; 292/DIG. 14, 225, 218, 213, 228, 219

[56] References Cited

UNITED STATES PATENTS

| | | | |
|---|---|---|---|
| 630,898 | 8/1899 | Kneisly | 296/76 |
| 1,698,959 | 1/1929 | Milligan | 292/DIG. 14 |
| 2,612,233 | 9/1930 | Newell | 180/69 C |
| 2,828,989 | 4/1958 | Kaiser | 292/DIG. 14 |
| 2,931,452 | 4/1960 | Mackie | 180/69 C |
| 2,939,541 | 6/1960 | Smalley | 180/89 A |
| 3,101,807 | 8/1963 | Witt | 180/69 C |
| 3,743,045 | 7/1973 | Hansen | 180/69 R |

FOREIGN PATENTS OR APPLICATIONS

| | | | |
|---|---|---|---|
| 1,189,407 | 3/1965 | Germany | 292/DIG. 14 |

*Primary Examiner*—M. H. Wood, Jr.
*Assistant Examiner*—Milton L. Smith
*Attorney, Agent, or Firm*—John C. Wiessler

[57] ABSTRACT

Self-locking latch device especially for hood and side panels of industrial trucks having a lock bolt and an adjustable spring loaded latch cooperable therewith to automatically engage and lock the latch to bolt in closing of the hood or side panel, while requiring manual actuation of latch to disengage and open the latter. The device is constructed to self-lock with an increasing force as any unintended force tending to open the latch increases.

15 Claims, 7 Drawing Figures

SELF-LOCKING LATCH FOR VEHICLE PANEL MEMBERS

BACKGROUND OF THE INVENTION

The field of art to which the invention pertains includes self-locking latches for vehicular panels.

SUMMARY

An improved and simplified self-locking latch operable in any selected position of mounting has a fixed camming bolt adapted to engage with and disengage from a spring loaded adjustable latch mounted from a movable vehicle panel member which must be manually actuated to disengage the latch from the bolt, the pivot axis of the latch relative to the pivot axis of the panel member being such that any tendency to open the panel member without manually actuating the latch causes the latch to increase the closing force thereof against the lock bolt whether or not the spring is operative.

It is a principal object of the invention to provide a relatively simple, low cost self-locking latch device for vehicle panel members.

Description of the Preferred Embodiment

Figure 1:
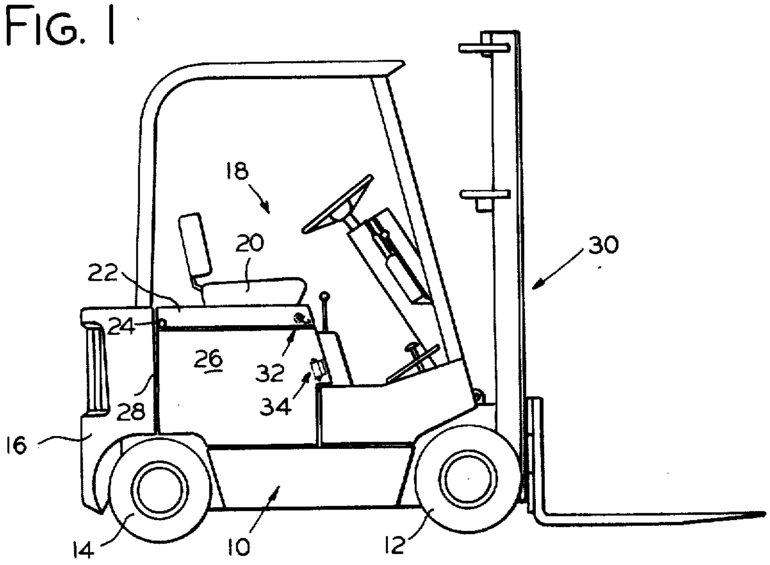
FIG. 1 is a side elevational view of an industrial lift truck which embodies the invention.
Figure 2:
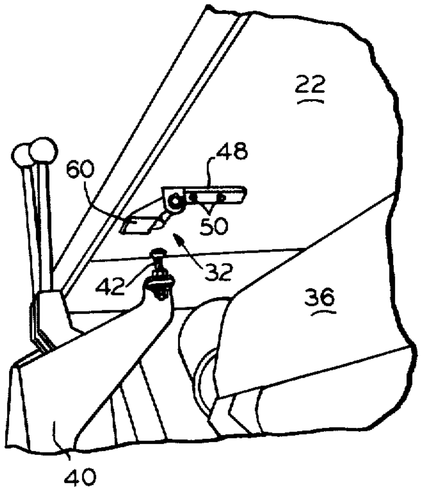
FIG. 2 is a broken-away perspective view of the latch device mounted on the hood member of the truck of FIG. 1.

An industrial life truck of well-known type is shown in FIG. 1 which comprises generally a body 10, drive and steer wheels 12 and 14, a counterweight 16 supported from the body, an operator's station 18 having a seat 20 mounted on a hood 22 which can be pivoted upwardly and downwardly about a hinge 24, hinged side panels, one of which is shown at 26, pivotable outwardly of the truck about a hinge 28, and a telescopic fork lift mast assembly 30. The latch device is shown mounted on member 22 at numeral 32 and on side panel 26 at numeral 34. A prime mover 36 is supported from body 10 under hood 22 and between panels 26.

Referring particularly to FIGS. 2 and 4–7, the latch device is shown in conjunction with hood member 22 and a fixed body part 40 extending upwardly and rearwardly beneath the hood member on the end of which is mounted an adjustable camming bolt 42 which is suitably secured in a selected adjusted position by the threaded portion of the bolt in conjunction with a pair of adjustment nuts and washers 44 operative on opposite sides of a horizontal ledge portion 46 of body member 40.

A plate 48 is secured suitably, as by bolts 50, to hood 22 from the one end of which is secured, as by welding, a transverse inverted U-shaped latch support member 52 having a pin 54 received in openings of the legs of the support member and extending through the pocket of the U-shaped member, snap rings 56 connected to opposite ends of the pin to secure it in position, and a torquing spring 58 extending longitudinally of the pin. A generally U-shaped latch member 60, the legs 62 of which extend upwardly and rearwardly of the base 64, registers in confronting relation with the inverted U-shaped support member 52 and has openings in the legs which mount latch member 60 pivotally from pin 54, as shown. One end of the torsion spring 58 has a relatively long projecting end 66 which is continuously in abutment with base 64, the opposite end of which spring projects at 68 into continuous contact with the base of support member 52. Thus, the force of the spring tends always to rotate latch member 60 in a counterclockwise direction as viewed in FIGS. 4 and 7, to a limit position in which upper edges 70 of the legs 62 are normally in abutment with the base portion of U-support 52, the flat abutting surface being best shown in the intermediate dotted line position at 70 in FIG. 7. Latch member 60 may be actuated manually against the force of spring 58 by hand pushing upwardly, for example, in a clockwise direction against base 64 to rotate member 60 in a clockwise direction as viewed in FIG. 7.

The operative end of bolt 42 is preferably formed of a pair of opposed conical portions 72 and 74 abutting at a flat intermediate common base 76 and adjusted vertically as required to mate with one of three arcuate cutout adjustment notches 80 which cooperate with the conical surfaces to cam member 60 over surface 72 and under surface 74 during engagement for automatically locking member 60, and therefore hood 22, in a closed position. Although it will be apparent that conical surfaces of revolution are preferable as at 72 and 74, it will also be apparent that conical surfaces are not essential, any suitable tapered arcuate surface being usable. Variations in design in this respect have been taken into account in the language of many of the claims herein in that portion 72 is defined as an inwardly tapered arcuate surface, and surface 74 as an outwardly tapered arcuate surface. The selected arcuate or semi-circular notch 80 preferably fully engages the conical surface 74, pressure thereto being applied by the torsion spring. Lifting the latch against the torsion spring describes a circular arc and, of course, upon release the latch assumes its spring urged position with the hood member open.

Figure 7:
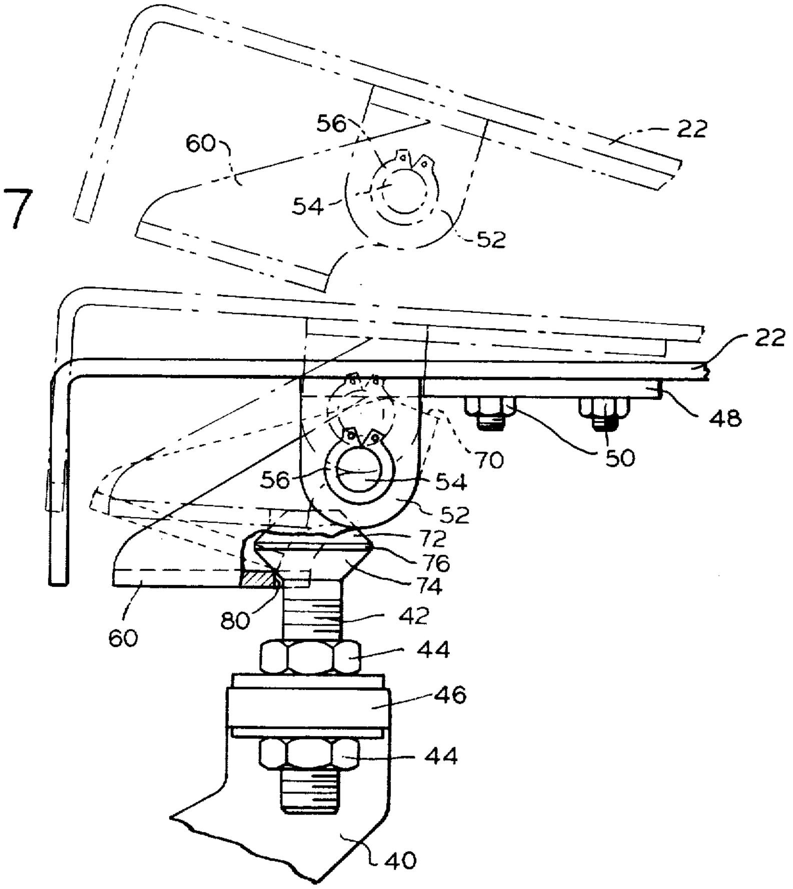
FIG. 7 is an enlarged view showing the latch device as in FIG. 4 in various operational positions.

The hood operation is best illustrated in FIG. 7 wherein four different positions are illustrated with the hood in various pivoted positions about hinge 24. In the uppermost position the latch is, of course, fully disengaged, and in the next lower broken-line position the appropriate notch 80 of latch member 60 has made initial contact with the upper conical surface 72. In the next dotted line position, in which only the latch member 60 is shown for clarity, the said latch member has been rotated in a clockwise direction against the force of spring 58 as the notch slides along surface 72; as the hood continues to pivot downwardly the notch 80 crosses flat surface 76 and is maintained by the spring in contact with the reverse conical surface 74 until reaching the fully locked solid line position illustrated. While the torsion spring is a desirable feature, it is not required in some installations in which the spring force may be replaced by the weight of the latch, by means of which the necessary momentum about the pivot point of the latch is produced.

The axis of pivot pin 54 of latch member 60 is geometrically so chosen that the circular arc described by the rotational movement of the latch follows tangentially the contour of the inner conical surface 74. It will be appreciated that the latch automatically locks in the position shown in FIG. 4. It is also important to note that the position of the latch pivot relative to the pivot hinge 24 of the hood is chosen so that if there is any tendency for the hood member to open without the latch being positively actuated to open, the engaged notch 80 of the latch is pulled tighter against the conical surface 74 with a force which increases as any such unintended opening force increases. Consequently, the latch is at all times self-locking, i.e., the hood cannot be opened without positive actuation of the latch. This will be apparent from a consideration particularly of FIG. 7 wherein it will be observed that any attempt to actuate hood 22 upwardly with pin 54 when the latch is locked and unactuated will effect a force moment which tends to rotate latch member 60 in a counterclockwise or self-locking direction in relation to surface 74.

The tapered or conical configuration of surface 74 provides an additional important feature in that the adjustment of the latch and lock bolt need not be precise in order to maintain the hinged panel or hood in a tight latched condition without jiggling, noisy vibration, and the like. This will be apparent when the alternative of a flat ledge is considered as a cooperative latching surface with latch member 60, as would be the case if latch base member 64 were to lock, for example, upon base section 76 of bolt 42 by eliminating tapered surface section 74.

Figure 3:
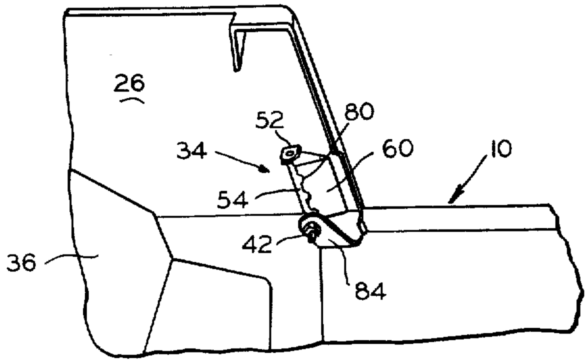
FIG. 3 is a broken-away perspective view of the latch mounted on a side panel member of the truck.
Figure 4:
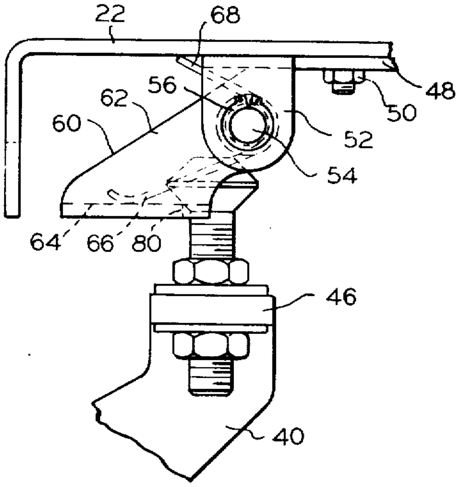
FIGS. 4, 5 and 6 are enlarged broken-away views in side, front and bottom elevation, respectively, of the latch device of FIG. 2 shown in a locked condition.
Figure 5:
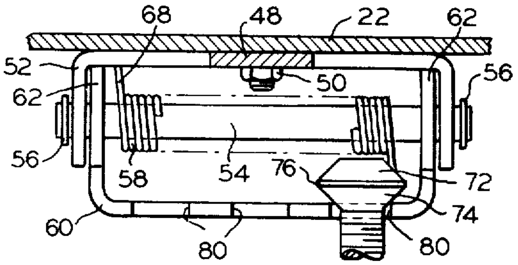
Figure 6:
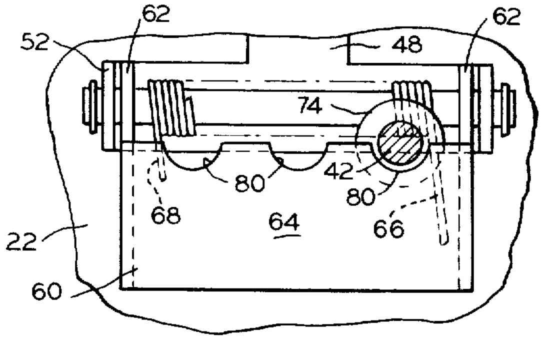

Referring now to FIG. 3, I have shown the latch positioned for operation between the hinged side panel 26 and body 10 on which is mounted a bracket 84, other similar parts being numbered the same as in FIGS. 2 and 4–7.

The latching device can, of course, be mounted in any position in relation to a vehicle body and hinged panel member, right or left and top or bottom.

It will be apparent to those skilled in the art that various changes in the structure and relative arrangement of parts may be made without necessarily departing from the scope of my invention.

I claim:

1. A latch device for a hinged panel member of a vehicle having a rigid body comprising a lock bolt secured to the body and extending outwardly toward the panel member, the outer end portion including an inwardly tapered arcuate surface, a generally U-shaped latch member supported pivotally from the panel member, the legs of which latch member extend normally over the lock bolt in a diagonal direction, the base of which latch member is adapted to engage during latching movement a portion of said arcuate surface which is located on one side of the axis of said lock bolt and which connects said legs at least partially longitudinally outwardly of said arcuate surface, and a pivot member from which the said legs of said U-shaped latch member are pivotally supported having an axis substantially transverse to the axis of the lock bolt and located on the opposite side of the bolt from the said arcuate surface portion when the base of the latch member is engaged with the bolt whereby an opening force applied to the panel member increases the locking force of the latch member on the bolt.

2. A latch device as claimed in claim 1 wherein said lock bolt includes an outwardly tapered arcuate surface in confronting relation to the inwardly tapered surface, said base of the latch member engaging said outwardly tapered surface when the latch member is locked on the bolt.

3. A latch device as claimed in claim 2 wherein the axis of said pivot member is selected such that the circular arc described by the rotational movement of the base of the latch member follows substantially tangentially the contour of the outwardly tapered arcuate surface.

4. A latch device as claimed in claim 2 wherein said outwardly tapered arcuate surface is substantially conical.

5. A latch device as claimed in claim 1 wherein the base of said U-shaped latch member includes a plurality of spaced notches configured to substantially complement those portions of the tapered arcuate surface which the notches are adapted to engage, said lock bolt and latch member being adjustable upon installation to thus align a selected one only of said notches with said arcuate surface.

6. A latch device as claimed in claim 1 wherein said U-shaped latch member is supported by a generally inverted U-shaped member secured to the panel member at the base end thereof and supporting from the legs said pivot member comprising a pivot pin from which the U-shaped latch member is supported.

7. A latch device as claimed in claim 6 wherein a torsion spring is mounted axially of the pivot pin and has outwardly extending opposite ends which function to apply the spring force to urge the latch member toward a latching position relative to the lock bolt, said latch member being manually pivotable against the spring when in a latched position relative to the lock bolt and being automatically pivotable during engagement of the latch member with said tapered arcuate surface.

8. A latch device as claimed in claim 7 wherein said lock bolt includes an outwardly tapered arcuate surface in confronting relation to the inwardly tapered surface, said base of the latch member engaging said outwardly tapered surface when the latch member is locked on the bolt.

9. A latch device as claimed in claim 8 wherein the base of said U-shaped latch member includes a plurality of spaced notches configured to substantially complement those portions of the tapered arcuate surfaces which the notches are adapted to engage, said lock bolt and latch member being adjustable upon installation to thus align one of said notches with said arcuate surfaces.

10. A latch device as claimed in claim 7 wherein the base of said U-shaped latch member includes a plurality of spaced notches configured to substantially complement those portions of the tapered arcuate surface which the notches are adapted to engage, said lock bolt and latch member being adjustable upon installation to thus align one of said notches with said arcuate surface.

11. A latch device as claimed in claim 1 wherein said vehicle is an industrial truck and said panel member is a pivoted hood covering prime mover means and on which is located an operator's seat assembly.

12. A latch device as claimed in claim 1 wherein said vehicle is an industrial truck and said panel member is a pivoted side panel which covers one side area of a prime mover compartment of the truck.

13. A latch device as claimed in claim 1 wherein the base of said latch member provides a relatively large surface area engageable by the hand of an operator for manipulating the latch device.

14. A latch device for a hinged panel member of a vehicle having a rigid body comprising a lock bolt secured to the body and extending outwardly toward the panel member, the outer end portion including an inwardly tapered arcuate surface, a generally U-shaped latch member supported pivotally from the panel member, the base of which latch member is adapted to engage during latching movement a portion of said arcuate surface which is located on one side of the axis of said lock bolt, the legs of which latch member extend outwardly and longitudinally of said portion of said arcuate surface, and a pivot member from which the said legs are pivotally supported having an axis substantially transverse to the axis of the lock bolt and located on the opposite side of the axis of the bolt from the said arcuate surface portion when the base of the latch member is engaged with the bolt whereby an opening force applied to the panel member increases the locking force of the latch member on the bolt, said base of said latch member providing a relatively large surface area for engagement by the hand of an operator to operate the latch device.

15. A latch device as claimed in claim 14 where each leg of said U-shaped latch member has a relatively elongated bottom which extends outwardly from said lock bolt, the base of the latch member being connected to the bottoms of said legs and extending longitudinally thereof.

* * * * *